United States Patent [19]

Sasayama

[11] Patent Number: 5,051,003
[45] Date of Patent: Sep. 24, 1991

[54] ROLLING BEARING

[75] Inventor: Masateru Sasayama, Osaka, Japan

[73] Assignee: Koyo Seiko Co., Ltd., Osaka, Japan

[21] Appl. No.: 545,778

[22] Filed: Jun. 29, 1990

Related U.S. Application Data

[63] Continuation of Ser. No. 348,447, May 8, 1989, abandoned.

[30] Foreign Application Priority Data

Sep. 29, 1988 [JP] Japan .................................. 63-127972

[51] Int. Cl.[5] ............................................. F16C 33/72
[52] U.S. Cl. ................................... 384/477; 384/488
[58] Field of Search ................................ 384/477–489

[56] References Cited

U.S. PATENT DOCUMENTS

| | | | |
|---|---|---|---|
| 2,308,110 | 1/1943 | Schmeiser | 384/477 |
| 2,915,345 | 12/1959 | Workman | 384/484 |
| 3,843,139 | 10/1974 | Messenger | 384/477 X |
| 4,325,591 | 4/1982 | Otto | 384/486 |

*Primary Examiner*—Thomas R. Hannon
*Attorney, Agent, or Firm*—Finnegan, Henderson, Farabow, Garrett, and Dunner

[57] ABSTRACT

A rolling bearing includes an outer ring having an inner cylindrical peripheral surface which is stepped at its one end portion to provide a stepped surface portion of a greater diameter extending axially from one end of the outer ring over a given length. A metal shield member includes a cylindrical body which is fixedly press-fitted in that portion of the inner peripheral surface of the outer ring disposed adjacent to the stepped surface portion in such a manner that one end of the cylindrical body of the metal shield member is disposed between the one end of the outer ring and said that portion of the inner peripheral surface in spaced relation to the stepped surface portion. With this construction, when press-fitting the metal shield member in the outer ring, the one end of the cylindrical body of the metal shield member will not be brought into contact with the inner peripheral surface of the outer ring.

11 Claims, 2 Drawing Sheets

ROLLING BEARING

This application is a continuation of application Ser. No. 07/348,447, filed May 8, 1989, now abandoned.

BACKGROUND OF THE INVENTION

This invention relates to a rolling bearing for use in a wheel hub of a vehicle or the like.

PRIOR ART

FIGS. 4 and 5 shows a conventional rolling bearing for use in a wheel hub of a vehicle. This bearing comprises an outer ring 60, a pair of first and second inner rings 67 and 68 disposed within the outer ring 60, a first series of balls 69 interposed between the outer ring 60 and the first inner ring 67, a second series of balls 70 interposed between the outer ring 60 and the second inner ring 68, a first retainer ring 71 holding the first series of balls 69 in place, and a second retainer ring 72 holding the second series of balls 70 in place. Further, a shield member 64 made of metal is fixedly press-fitted in one end portion 61 of the outer ring 60, the metal shield member 64 having a cylindrical body 65 and a radially inwardly-directed peripheral flange 64a so that the metal shield member 64 has an L-shaped cross-section. The cylindrical body 65 of the metal shield member 64 is press-fitted in an inner cylindrical peripheral surface 63 of one end portion 61 of the outer ring 60. Reference numeral 73 denotes an oil seal mounted on the other end 62 of the outer ring 60.

When the metal shield member 64 is to be attached to the outer ring 60, the bearing is so disposed that the one end 61 of the outer ring 60 is directed upwardly, as shown in FIG. 6. Then, the metal shield member 64 is press-fitted into the outer ring 60 from above as indicated by an arrow (FIG. 6), with the flange 64a directed downwardly, to thereby fix the metal shield member 64 to the outer ring 60. During this press-fitting operation, the outer end or edge 66 of the cylindrical body 65 of the metal shield member 64 shaves the inner peripheral surface 63 of the outer ring 60. As a result, the thus shaved particles of the metal (iron) of the outer ring 60 intrudes into the interior of the bearing through a space between the metal shield member 64 and the inner ring 67, which tends to shorten a service life of the bearing and to caus other adverse effects.

SUMMARY OF THE INVENTION

It is, therefore, object of this invention to provide a rolling bearing in which the edge or end of the cylindrical body of the metal shield member will not shave the inner peripheral surface of the outer ring when the metal shield member is press-fitted in the outer ring.

According to the present invention, there provided a rolling bearing comprising:
(a) an outer ring having an inner cylindrical peripheral surface, said inner peripheral surface being stepped at its one end portion to provide a stepped surface portion of a greater diameter extending axially from one end of said outer ring over a given length;
(b) an inner ring mounted within said outer ring;
(c) a series of rolling members interposed between said outer and inner ring; and
(d) a metal shield member including a cylindrical body, said cylindrical body being fixedly press-fitted in that portion of said inner peripheral surface of said outer ring disposed adjacent to said stepped surface portion in such a manner that one end of said cylindrical body of said metal shield member is disposed between said one end of said outer ring and said that portion of said inner peripheral surface in spaced relation to said stepped surface portion.

With this construction, the metal shield member can be press-fitted in the outer ring in such a manner that the one end of the cylindrical body of the metal shield member is not brought into contact with the inner peripheral surface of the outer ring. Therefore, during the press-fitting operation, the one end of the cylindrical body of the metal shield member will not shave the inner peripheral surface of the outer ring.

DESCRIPTION OF THE PREFERRED EMBODIMENTS OF THE INVENTION

The invention will now be described with reference to FIGS. 1 to 3.

Figure 1:
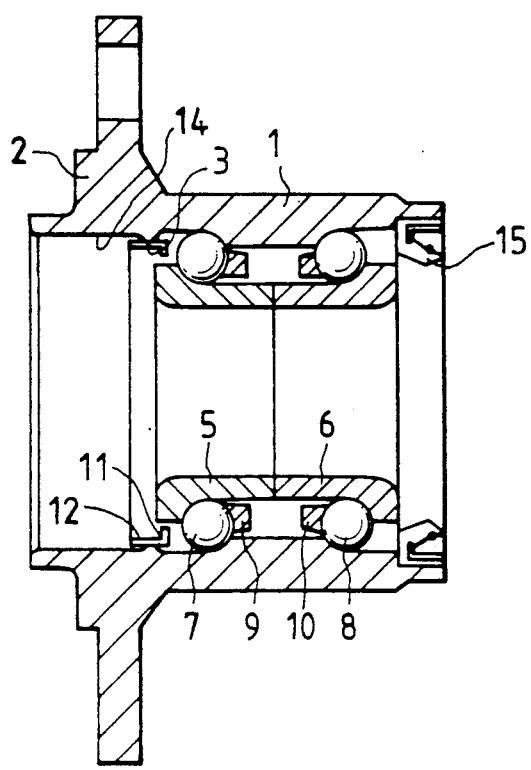
FIG. 1 is a cross-sectional view of a rolling bearing provided in accordance with the present invention.

FIG. 1 shows a rolling bearing for use, for example, in a wheel hub of a vehicle. This rolling bearing comprises a flanged outer ring 1, a pair of first and second inner rings 5 and 6 disposed within the outer ring 1 in juxtaposed relation to each other, a first series of balls 7 interposed between the outer ring 1 and the first inner ring 5, a second series of balls 8 interposed between the outer ring 1 and the second inner ring 6, a first retainer ring 9 holding the first series of balls 7 in place, and a second retainer ring 10 holding the second series of balls 8 in place. Further, a shield member 11 made of metal is fixedly fitted in one end portion 2 of the outer ring 1, the metal shield member 11 having a cylindrical body 12 and a radially inwardly-directed peripheral flange 12a formed on one edge of the cylindrical body 12, so that the metal shield member 11 has an L-shaped cross-section as best shown in FIG. 2. The cylindrical body 12 of the metal shield member 11 is press-fitted in an inner cylindrical peripheral surface 3 of the one end portion 2 of the outer ring 2, thereby fixing the metal shield member 11 to the outer ring 1. Reference numeral 15 denotes an oil seal mounted on the other end of the outer ring 1.

Figure 2:
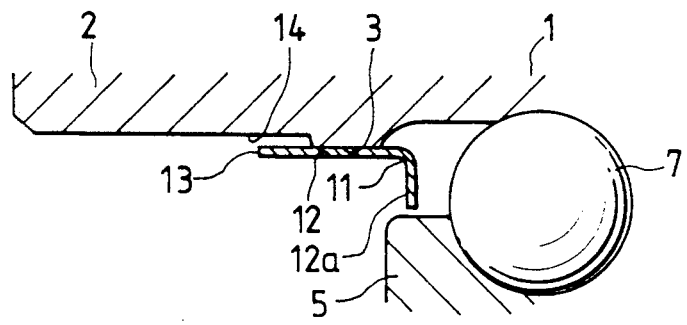
FIG. 2 is an enlarged fragmentary cross-sectional view of the rolling bearing.

As best shown in FIG. 2, the inner peripheral surface 3 of the one end portion 2 of the outer ring 1 is stepped to provide a stepped surface portion 14 of a greater diameter extending axially from one end of the outer ring 1 over a given length. The cylindrical body 12 of the metal shield member 11 is press-fitted in that portion (effective portion) of the inner cylindrical surface 3 disposed adjacent to the stepped surface portion 14 of a greater-diameter. The stepped surface portion 14 extends parallel to the axis of the outer ring 1. The effective portion of the inner peripheral surface 3 of the outer ring 1 has a considerably smaller axial length than that of the cylindrical body 12 of the metal shield member 11.

For attaching the metal shield member 11 to the outer ring 1, the metal shield member 11 is inserted into the one end portion 2 of the outer ring 1, with the flange 12a directed inwardly, and then the cylindrical body 12 of the metal shield member 11 is press-fitted in the effective portion of the inner peripheral surface 3 of the outer ring 1 in such a manner that the outer end or edge 13 of the cylindrical body 12 is disposed between the one end of the outer ring 1 and the effective portion of the inner peripheral surface 3 in spaced relation to the stepped surface portion 14. Thus, the metal shield member 11 is fixed to the outer ring 1 by this press-fitting.

During this press-fitting operation, the outer end 13 of the cylindrical body 12 of the metal shield member 11 is not brought into contact with the inner peripheral surface 3 of the outer ring 1 because of the provision of the stepped surface portion 14. In other words, the cylindrical body 12 of the metal shield member 11 is press-fitted in the inner peripheral surface 3 except for its outer end portion.

Figure 3:
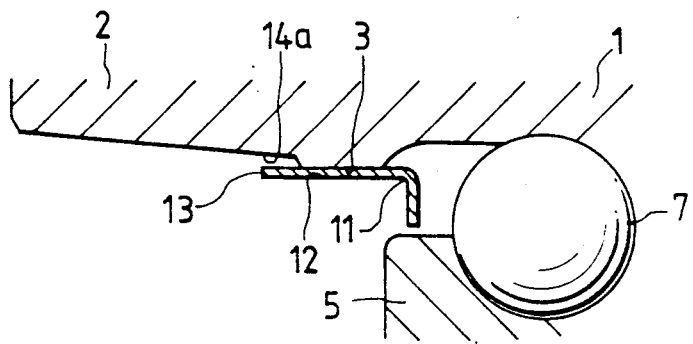
FIG. 3 is a view similar to FIG. 2 but showing a modified form of the invention.
Figure 4:
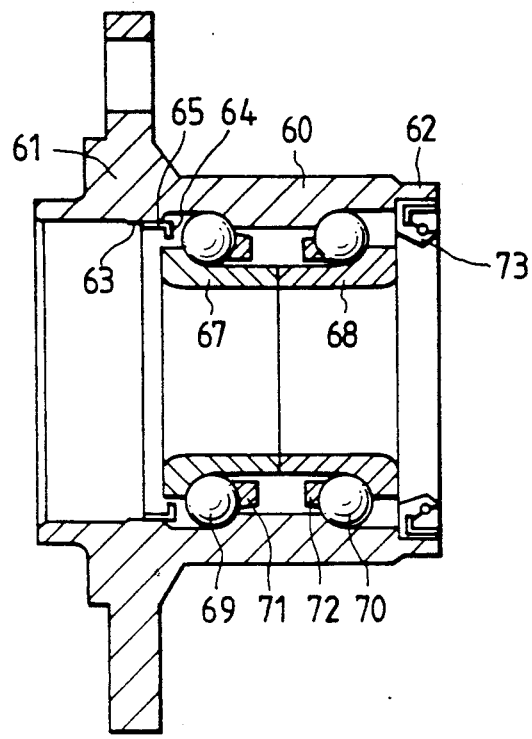
FIG. 4 is a cross-sectional view of a rolling bearing provided in accordance with the prior art.
Figure 5:
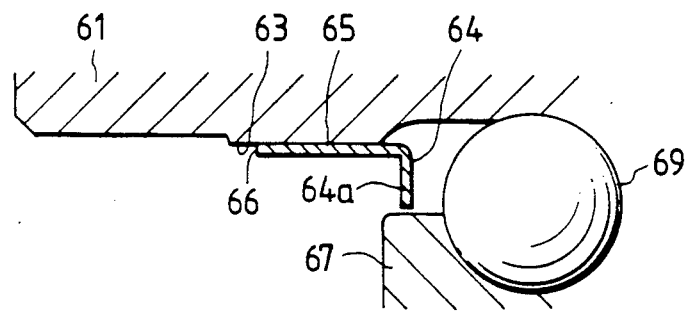
FIG. 5 is an enlarged fragmentary cross-sectional view of the bearing of FIG. 4.
Figure 6:
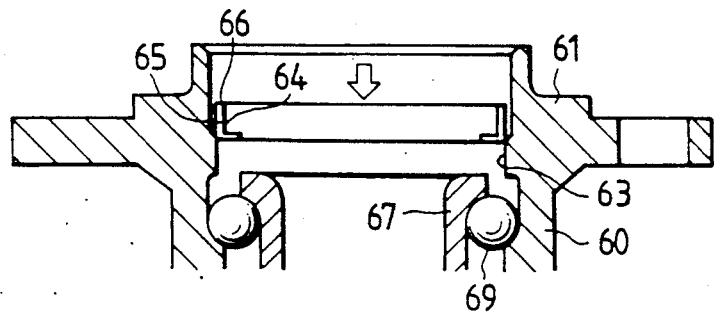
FIG. 6 is a fragmentary cross-sectional view of the bearing of FIG. 4, showing the manner of press-fitting a metal shield member in an outer ring.

FIG. 3 shows a modified rolling bearing which differs from the bearing of FIGS. 1 and 2 in that stepped surface portion 14a is tapered toward the one end of the outer ring 1.

Since the outer end 13 of the cylindrical body 12 of the metal shield member 11 is not brought into contact with the inner cylindrical peripheral surface 3 of the outer ring 1 during the press-fitting of the metal shield member 11 into the outer ring 1, the inner peripheral surface 3 is not shaved by the outer end 13, so that no shaved particles will be produced. Therefore, there is no risk that such shaved particles would be introduced into the moving parts of the bearing.

While the rolling bearings according to the present invention have been specifically shown and described herein, the invention itself is not to be restricted to the exact showing of the drawings or the description thereof. For example, another metal shield member 11 may additionally be attached to the other end of the outer ring 1. Further, the principle of the present invention is applicable to other types of bearings than those decried in the above embodiments.

What is claimed is:

1. A roller bearing comprising:
   an outer ring having an inner peripheral surface, a stepped surface spaced radially outward a predetermined distance from said inner peripheral surface, and an inclined surface connecting said inner peripheral surface and said stepped surface, said stepped surface extending from an edge of said outer ring to said inclined surface and having a surface area substantially greater than the surface area of said inner peripheral surface;
   a non-resilient metal shield member having a cylindrical body and a flange portion, and being substantially L-shaped in cross-section, said cylindrical portion being press-fittingly engaged with said inner peripheral surface of said outer ring for maintaining a portion of said cylindrical body at said predetermined distance from said stepped surface and for preventing at least a portion of said cylindrical body from contacting said stepped surface.

2. A roller bearing according to claim 1, wherein said inner peripheral surface extends parallel to a central axis of said outer ring.

3. A roller bearing according to claim 1, further including rolling members disposed therein, said stepped surface of said outer ring being tapered in a direction away from said rolling members.

4. A roller bearing according to claim 1, wherein said flange portion extends towards said central axis.

5. A roller bearing having a central axis, comprising:
   first and second series of circularly arranged ball bearings;
   inner and outer rings cooperating to support said first and second series of ball bearing therebetween, said outer ring having a portion extending in an axial direction beyond an edge of said inner ring, said outer ring having an inner peripheral surface and a stepped surface spaced a predetermined distance from said inner peripheral surface, said stepped surface having a surface area greater than a surface area of said inner peripheral surface;
   a non-resilient substantially L-shaped shield member including a cylindrical body having a first end and a second end, and a flange extending from said first end, said cylindrical body being press-fittingly engaged with said inner peripheral surface, said inner peripheral surface maintaining said second end of said cylindrical body at said predetermined distance from said stepped surface.

6. A roller bearing according to claim 5, wherein said flange has a lesser dimension than said cylindrical body.

7. A roller bearing according to claim 5, wherein said peripheral surface and said stepped surface are substantially parallel to each other.

8. A roller bearing according to claim 5, wherein said inner peripheral surface is substantially parallel to the central axis.

9. A roller bearing according to claim 8, wherein said stepped surface tapers away from said central axis.

10. A roller bearing having a central axis, comprising:
    first and second series of circularly arranged rolling members;
    an outer ring and an inner ring, said first and second series of rolling members being disposed therebetween, said outer ring having an inner surface;
    a substantially L-shaped shield member including a cylindrical body having a first end and a second end, and a flange portion extending from said first end; and
    spacing means disposed on said inner surface of said outer ring for maintaining said second end of said shield member a predetermined distance from said inner surface, said shield member being press-fittingly engaged with said spacing means, said spacing means also for preventing contact between at least a portion of said shield member and said inner surface during assembly of said roller bearing.

11. A roller bearing according to claim 10, wherein said spacing means includes an engaging surface, said inner surface being stepped a predetermined distance from said engaging surface, said engaging surface having a surface area substantially less than a surface area of said inner surface.

* * * * *